United States Patent
Krämer et al.

(10) Patent No.: US 7,800,248 B2
(45) Date of Patent: Sep. 21, 2010

(54) BACKUP POWER SYSTEM

(75) Inventors: Thomas Krämer, Hofgeismar (DE); Martin Rothert, Niestetal (DE); Volker Wachenfeld, Hofgeismar (DE); Andreas Falk, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 367 days.

(21) Appl. No.: 12/009,975

(22) Filed: Jan. 23, 2008

(65) Prior Publication Data

US 2008/0203820 A1 Aug. 28, 2008

(30) Foreign Application Priority Data

Feb. 27, 2007 (EP) .................................. 07003991

(51) Int. Cl.
*H02J 1/00* (2006.01)

(52) U.S. Cl. .......................................... 307/65; 307/19

(58) Field of Classification Search ............... 307/19, 307/29, 45, 65, 69, 75, 130; 700/292; 702/60
See application file for complete search history.

(56) References Cited

U.S. PATENT DOCUMENTS

| | | | |
|---|---|---|---|
| 6,304,006 B1 | 10/2001 | Jungreis | |
| 6,942,843 B2 | 9/2005 | Vithal et al. | |
| 6,960,843 B2 * | 11/2005 | Yamamoto | 307/86 |
| 2001/0056330 A1 * | 12/2001 | Wills | 702/60 |
| 2002/0135233 A1 * | 9/2002 | Cratty | 307/64 |
| 2002/0143438 A1 | 10/2002 | Akiyama et al. | |
| 2003/0048004 A1 * | 3/2003 | Fleming et al. | 307/64 |
| 2003/0080741 A1 * | 5/2003 | LeRow et al. | 324/320 |
| 2003/0111103 A1 * | 6/2003 | Bower et al. | 136/244 |
| 2003/0197431 A1 * | 10/2003 | Lathrop et al. | 307/125 |
| 2004/0070281 A1 * | 4/2004 | Lineberger | 307/85 |
| 2005/0135031 A1 * | 6/2005 | Colby et al. | 361/78 |
| 2008/0018175 A1 * | 1/2008 | Mcnamara et al. | 307/84 |
| 2008/0122293 A1 * | 5/2008 | Ohm | 307/86 |
| 2009/0021079 A1 * | 1/2009 | Johnson et al. | 307/68 |

FOREIGN PATENT DOCUMENTS

| | | |
|---|---|---|
| EP | 0 817 350 A2 | 1/1998 |
| WO | WO 03/077398 A | 9/2003 |

* cited by examiner

*Primary Examiner*—Albert W Paladini
*Assistant Examiner*—Daniel Cavallari
(74) *Attorney, Agent, or Firm*—Eschweiler & Associates, LLC

(57) ABSTRACT

The subject matter of the invention is a backup power system configured to be a UPS system, with a customer generation system and with a network monitoring device with a switch topology including a first connection node, that is connected to the customer generation system that is connected to at least one automatic disconnection switch including a first switch said first switch being disposed between the customer generation system and a utility grid, and that is connected to a second switch that is connected to one or several loads, said system including a second connection node that is connected to said second switch connected to said load, that is connected to a third switch disposed between the utility grid and the load and that is connected to a fourth switch to which there is connected a standalone inverter with a storage device, and said system including a third connection node, connecting said first switch and said third switch to said utility grid, said customer generation system supplying an AC voltage that can be added to the circuit, in parallel to said utility grid, the grid monitoring device for opening said first switch being provided upon a failure of the utility grid.

18 Claims, 8 Drawing Sheets

BACKUP POWER SYSTEM

CROSS-REFERENCE TO RELATED APPLICATIONS

This application claims Priority from European Application No. EP 07003991.2 filed on 27 Feb. 2007

FIELD OF THE INVENTION

The invention relates to a backup power system configured to be a UPS system, with a customer generation system and with a network monitoring device.

BACKGROUND OF THE INVENTION

In customer generation systems for generating electric energy such as solar generators, wind energy systems with PM generator, variable speed combustion engines or fuel cells, the power fed into the grid varies strongly. Attractive special rates are often offered for such customer generation systems so that, from an economical point of view, it is increasingly interesting for the operator of such systems to feed the generated power into the utility grid. Due to the different rates, the generated and consumed energy is usually metered using different meters. Grid parallel operation calls for taking into consideration particular conditions of security and connection.

What is referred to as network monitoring is also known; it is very important. For a customer generation system must detect the grid failure and then stop operating. It is not allowed to further feed power into the grid because of the possible risk of injury to grid maintenance workers when a grid section has been disconnected whilst the customer generation system continues to work in this section. Network monitoring methods are known, which are divided into passive and active methods. Passive methods only evaluate the measured values of one-phase and three-phase grid voltage and grid frequency. Active methods are characterized in that power or voltage distortions affect the grid in such a manner that the grid parameters or the grid impedance can be inferred from the response. From current distortion one obtains a voltage response and vice-versa, from voltage distortion one obtains a current response.

Accordingly, a grid monitoring system must be effective in what is referred to as the grid operation. In what is referred to as island operation in which the connection to the utility grid is interrupted and only the loads of a defined previously known section are further supplied, it is known to turn off grid monitoring. This happens because the grid impedance during grid operation is much lower than the impedance in the island mode of operation. Additionally, in such an approach, the modular extensibility is facilitated since the grid impedance of the island network changes in the event of a modular extension. Faulty cut-off, in particular in the event of greater load steps, of the internal grid monitoring of the customer generation system occurring as a result of the changed grid parameters are advantageously avoided. The entire system thus becomes more stable, more specifically when operated as an island network.

Customer generation systems are known in which the electric loads continue to be supplied upon a grid failure. They need additional devices.

One additional device in this sense is a functional unit the operator must install in order to allow an existing customer generation system to work as a backup power supply system.

Advantageously, when more electric loads need to be supplied with backup power, the system can only be extended using modules added in the form of additional components without certain electric loads having to be associated with a certain functional unit of the additional device.

For an uninterruptible supply of the loads to be ensured, it is practical to always operate the backup power system in the same control mode both when it is in load operation, in which a utility grid is provided, and in unload operation, in which a utility grid is not provided, so that there is no need to interrupt the supply in order to switch over the controller. The same applies in the event the utility grid resumes operation.

When customer generation systems are installed on line taps, inadmissible high grid voltages may generate in this line tap when the infeed is high and the consumption low. The additional device may then be used to absorb energy and to accordingly lower the grid voltage. As a result, the grid can be stabilized so as to allow for the installation of customer generation systems even on line taps, which would not be possible otherwise.

On the other side, the grid voltage may reach inadmissible low values on these line taps when consumption is very high. Here also, the additional device can be used in order to supply power from the battery for the high consumption peaks. Accordingly, the grid voltage at the consumption node can be kept stable even on greater electric loads.

Grid parallel customer generation systems are known that can be additionally used as backup power supply systems.

DESCRIPTION OF THE PRIOR ART

A separate UPS system having a battery charger and a battery inverter is known from EP 0 817 350 A2. This system is what is referred to as an online UPS system.

This system is operated in such a manner that backup power supply is ensured by disconnecting the customer generation system from the grid when the utility grid fails. Then, an additional socket is supplied with electric energy. An inverter, which makes the voltage available at this socket, is then supplied through a battery. The battery is charged by a battery charger that is supplied from the utility grid or from the customer generation systems.

The customer generation systems implemented for this purpose are configured in such a manner that they can continue to work as an island network after switch-over. Only the battery charger is connected to this island network.

In the event of a failure of the utility grid, electric loads must be connected by hand to the additional socket, which on the one side is inconvenient and on the other side is also very undesirable in some cases because of the current interruption.

If electric loads are always supplied through the additional socket, losses generated in the battery charger and in the additional inverter must be accepted. In this case, the system is operated as what is referred to as an online UPS system. If the online UPS system is defective, the electric loads supplied through the system must be connected to the utility grid via an additional switching device.

This solution does not ensure current supply to the associated loads.

This UPS system has further drawbacks. If the system is operated as an online UPS system, additional conversion losses must be put up with and a data connection between the existing customer generation systems and the switch unit is also needed. As a result, it is difficult to convert an existing customer generation system into a system with ensured power supply since the electric loads that are supplied via the online UPS system need to be connected to the utility grid through an additional switching device when the online UPS system is defective. Electric loads with ensured supply are associated with exactly one battery inverter. Accordingly, very big loads cannot be associated with several inverters. A plurality of loads must moreover always be distributed among certain inverters.

Moreover, the customer generation system, electric loads and the backup power supply are not connected in parallel on the AC side so that a secured power supply of and grid parallel operation is not possible.

U.S. Pat. No. 6,949,843 B2 shows and describes a coupling device for coupling an energy accumulator and a customer generation system on a DC side. The system described is what is referred to as an offline UPS system.

In this system, there is only provided one DC-AC converter for feeding electric energy to the utility grid or for supplying special electric loads when grid power is unavailable.

Since the energy source, for example a photovoltaic generator, has a heavily fluctuating voltage in the cases described herein, a bidirectional adaptor must be provided between the energy source and the battery.

What is referred to as a "transfer unit" is mounted downstream of the DC-AC converter. In the event of a grid failure, this unit disconnects the DC-AC converter and the special loads from the grid. Thereafter, they are connected to the output of the DC-AC converter through which they are supplied. The loads are not supplied during switching.

As an alternative to supplying energy from the photovoltaic generator, the battery may be charged from the utility grid through a separate battery charger.

In this offline solution, there is no possibility of modular extension except that electric loads cannot be supplied without interruption since a certain number of special loads are associated with a certain DC-AC converter. As a result, loads consuming high power cannot be associated with several DC-AC converters. A plurality of loads must therefore always be distributed among certain DC-AC converters. Another disadvantage is that the entire system must be designed for operation as a secured power supply from the onset, when the customer generation system is mounted, since the battery must be connected to the DC side and the DC-AC converter must be also suited for island operation from the very outset. In addition, existing customer generation systems without DC intermediate circuit, more specifically wind generators with an asynchronous generator, cannot be integrated.

An additional device, namely a bidirectional adapter, is needed and makes the system more expensive.

If the battery is desired to also be charged from the utility grid, an additional battery supply apparatus is further needed.

Solutions are also known which have a battery inverter and a customer generation system coupled on the AC side.

In the catalogue "Smart Energy Concepts", August 2006, of Studer Inc. in Sion (Switzerland), there is described on page 11 a system combining a battery inverter with a customer generation system, with the network monitoring of the customer generation system staying operative both in the grid operation and in the island operation mode.

Such a system is regulated such that current control is operative in the standalone inverter in load operation. In the event of a grid failure, the control must be switched to voltage control. As a result, the supply of the loads is interrupted in all network configurations.

A disadvantage of this system is hat the customer generation system often turns off in island operation because the grid parameters change more in the island operation mode than in the grid operation mode when loads are added to or removed from the circuit. As a result, the stability of the entire system is restricted. Further, modular extension is made more difficult. When a battery inverter and a customer generation system are coupled to the AC side in accordance with prior art, uninterruptible supply of the loads cannot be achieved because the controller needs to be switched.

A backup power system configured to be a UPS system having a customer generation system and a grid monitoring system is known from U.S. Pat. No. 6,304,006 B1, said system being configured to be a UPS (Uninterruptible Power Supply) or backup system. It comprises a grid monitoring device. A solar generator can thereby be connected to a load via a switch. The solar generator is connected to a standalone inverter that converts the DC voltage of the solar generator into a grid-equivalent AC voltage. A utility grid is connected to the switch. Through the switch however, only the grid or only the solar generator can be selectively connected to the load. Alternatively, a battery rather than the solar generator can be connected to the standalone inverter. Through this switch topology, it is not possible to connect at the same time the solar generator and the battery to the load. If the solar generator is utilized to provide backup power, an additional auxiliary generator connected to the standalone inverter must be utilized during the night. With this solution, the standalone inverter must be dimensioned for the highest possible performance. This is expensive since the standalone inverter must be oversized. If the performance limit of the standalone inverter is exceeded, a new, more powerful inverter must be utilized. For the AC generator cannot not supply the load directly.

The US 2002/143438 A1 shows and describes a switch topology for fuel cells that are connected to a utility grid. The topology comprises three connection nodes, namely a first node to which there are connected the fuel cells with a DC/AC converter, a switch for grid connection as well as an additional switch for connecting a load, a second node to which there are connected the load, an additional switch and the switch for the load, and a third node for connecting the grid to the additional switch and the first switch. A load management is further provided. This load management serves to connect the fuel cells to the grid in times of peak load, such as in certain seasons or at certain day times, in order to avoid grid failure.

An island network comprising regenerative power generators, namely several wind energy plants and several solar generators is known from WO 03/077398 A2. Each solar generator is connected to a DC/DC converter. The DC/DC converters are connected to a DC/AC converter in a bus-like fashion. Storage devices or batteries are further utilized, each comprising a DC/DC converter.

BRIEF DESCRIPTION OF THE INVENTION

It is the object of the invention described herein to find an improvement over prior art for providing an extension of grid parallel customer generation systems on the grid side according to which a customer generation system is complemented so that, on the one side, it can be used to provide backup power and on the other side, can be extended using modules, an uninterruptible power supply of the loads and disconnection from the grid in the event of a grid failure being possible.

This object is solved by a backup power system implemented as a UPS system, with a customer generation system and with a monitoring device, said system including a first connection node connected to the customer generation system that is connected to at least one automatic disconnection switch including a first switch, said first switch being disposed between the customer generation system and a utility grid, and that is connected to a second switch that is connected to one or several loads, said system also including a second connection node that is connected to the second switch connected to the load, that is connected to a third switch disposed between the utility grid and the load and that is connected to a fourth switch to which there is connected a standalone inverter with a storage device, and said system including a third connection node connecting the first switch and the third switch to the utility grid, the customer generation system supplying an AC voltage that can be added to the circuit, in parallel to the utility grid, the grid monitoring device for opening the first switch being provided upon a failure of the utility grid.

The invention provides a solution for grid parallel customer generation systems to be capable of supplying backup power.

The invention further provides an online UPS system, it being advantageous if the switching time of each switch is no more than 50 ms, more specifically no more than 30 ms; each switch may thereby be implemented as a contactor. Secure uninterruptible power supply is thus ensured.

The invention can be installed in addition to an already existing customer generation system without the feeding device (e.g., the solar inverter) having to be replaced.

The invention further allows parallel operation of a e.g., battery supported backup power supply to the utility grid (other energy storage devices such as flywheel storage systems, UC capacitors, EEstores, fuel cells and so on are also possible) and realizes the following advantages:

An energy storage device of a backup power system can permanently be recharged so that sufficient energy is available in the event of a grid failure. The energy flow and the voltage of the energy storage device can be influenced to ensure long life of the storage device.

An "automatic disconnection switch" (earlier ENS) is provided for the customer generation systems for making an internal automatic disconnection switch of the customer generation system inoperative. As a result, the customer generation system can advantageously continue to operate in an island mode of operation.

In the event of a failure of the utility grid, the loads can, as a rule, be supplied with power without any interruption. If there is no connection to the utility grid, an island network is formed until the utility grid is operative again. Then, the loads can again be supplied from the utility grid.

Prior to being reconnected to the circuit, the island network can be synchronized with the utility grid in voltage and frequency.

In the event of shorts in the utility grid, the voltage drop at the loads supplied from the backup power supply cannot last for more than 30 ms.

All the infeed safety requirements according to the valid rules of the art are met.

It is further possible to distinguish between the power sourced from the utility grid and the one fed by the customer generation system using separate counters.

In an advantageous developed implementation of the invention, there is provided that each switch is integrated in such a manner into an additional device that each component is disposed in an appropriate box or in one or several control panels and that the additional device is connected between the utility grid and the customer generation system. The standalone inverter as well as the energy storage device may be a constituent part of the additional device.

In another advantageous developed implementation of the system of the invention there is provided a device for detecting an island network, said device being implemented such that it controls the coupling of the customer generation system to the grid so that the additional device can be completely isolated from the grid in the event of a grid failure. As a result, the power need of electric loads can be ensured by the customer generation system when power supply is low, namely through the energy storage device, such as a battery, that is connected to the standalone inverter. This is important when photovoltaic generators are utilized in the customer generation system, since these generators do not supply any power by night or supply too little power when the solar radiation is low.

Optimal adaptation to increasing power need is given when several customer generation systems are connected in parallel. Since, between the utility grid and the customer generation system, the additional device includes a switch that can be implemented as a contactor, and since the switch may also be designed at relatively low cost for high current intensities, modular extension is possible. Several standalone inverters can be connected in parallel if the size of the load calls for it.

Another advantage is obtained if the additional device contains an automatic disconnection switch so that the grid monitoring of the customer generation system can be set in such a manner that it may be operated both in the grid parallel and in the island mode of operation, which means that the grid monitoring is taken over by the additional device with the standalone inverters.

The additional device further comprises an automatic disconnection switch, a transfer contactor, a contactor, a grid voltage meter and a grid current meter, so that the device can be operated self-sufficiently.

When used as a mobile system, there is advantageously provided that the transfer contactor is a two-pole contactor, the one pole being configured such that, upon switching from grid parallel operation to island operation, the pole of the contactor that is connected to the neutral conductor of the logical point can be switched to PE by the neutral conductor of the grid.

According to an advantageous feature, there is further provided that the transfer contactor is turned on between the grid and the load as soon as there is voltage in the grid and the standalone inverter(s) operate in the charging mode of operation or are not operative. This is to ensure power supply when the standalone inverter is not operative.

Another object of the invention is a method of operating an additional device, the customer generation system being data connected to the additional device and being influenced in such a manner through data communication that switching the mode of operation from island operation to grid operation is possible, the switching of the mode of operation being controlled such that, upon failure of the data connection, the customer generation system switches over to grid parallel operation or remains in this mode of operation.

Further advantageous implementations of the invention are recited in the dependent claims.

The invention will be described in closer detail herein after with reference to the drawings.

In said drawings:

DETAILED DESCRIPTION OF THE INVENTION

In the Figs., the same numerals will be used to identify identical components.

Figure 1:
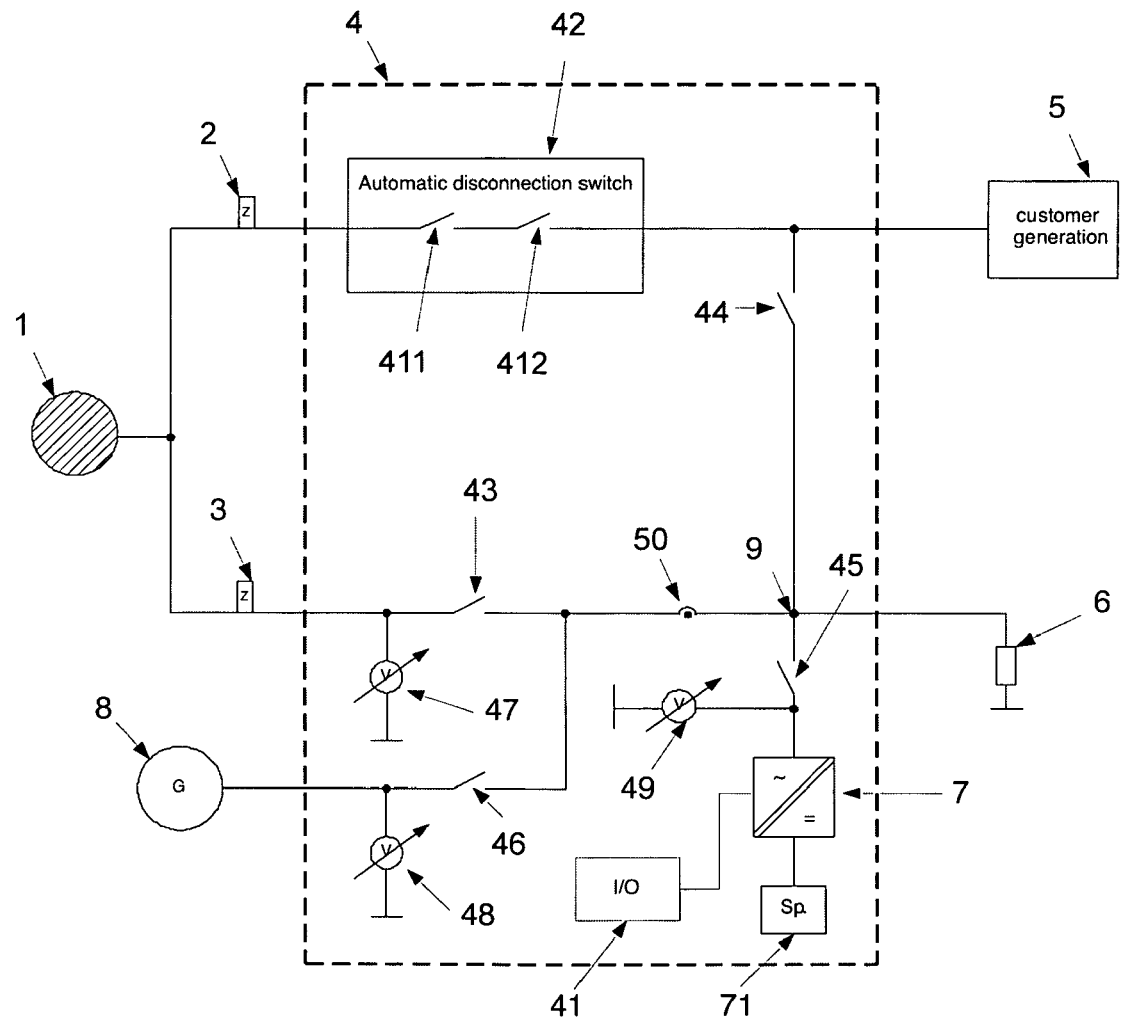
FIG. 1-8 show eight different exemplary embodiments of the additional device.

FIG. 1 depicts an embodiment of a backup power system or additional device 4. This device includes connections for a first meter 2 that is more specifically implemented as a export meter, and a second meter 3, that is more specifically implemented as a import meter.

The additional device 4 is connected to a utility grid 1 through the export meter 2 and the import meter 3.

One or several customer generation systems 5 (e.g., solar generator with solar inverter), the loads 6 and, if needed, a generator 8 are connected to the additional device 4 having the standalone inverter 7. The standalone inverter may consist of one or several standalone inverters connected in parallel. The grid monitoring system (ENS) possibly provided in the customer generation system stops operating as soon as the customer generation system 5 has been connected to the additional device 4.

On its DC side, the standalone inverter 7 is connected to an energy storage device such as a battery 71. The standalone inverter 7 may comprise an internal galvanic isolation between the AC and the DC side. This isolation can be realized through a transformer operating at the same frequency as the grid or through one or several high-frequency transformers.

The standalone inverter 7 is advantageously configured to be an H-bridge composed of semiconductor switches. These semiconductor switches may consist of MOS transistors, IGBT transistors or GTO thyristors.

In accordance with the invention, the standalone inverter 7 is configured such that, in the event of a short in load electric circuits during island operation, existing overload protection members of the load electric circuits are enabled.

The contactor 45 is triggered such that, in the event of a short in a load electric circuit and of the voltage drop at the logical point 9 related thereto, the contactor contacts remain closed until the short-circuit current of the inverter 7 enables the associated overload protection member of the load electric circuit so that the voltage in the logical point 9 is restored.

The additional device 4 contains an interface unit 41. This unit serves for linking the standalone inverter(s) 7 with the sensors and actuators in the additional device 4. An appropriate data bus (e.g., a CAN bus) is used as a connection. The one or several customer generation systems are connected to the export meter 2 via the automatic disconnection switch 42. This disconnection switch contains at least one contactor 411; it may however also contain an additional contactor 412, which is connected in series with this contactor. The contactors 411 and 412 may be configured as a single pole contactor or as a circuit breaker. The loads 6 are connected to the grid 1 via the transfer contactor 43. The contactor 44 connects the customer generation system 5 to the loads 6 via the logical point 9 when the transfer contactor 43 is opened and the system is operated in the island mode of operation. The contactor 45 connects the standalone inverter 7 with the loads 6 via the logical point 9. The contactor 46 connects a generator 8 to the loads 6 via the logical point 9. These contactors may be configured as a single pole contactor or as a circuit breaker each.

The additional device 4 contains at least the following measurement value detectors: a grid voltage meter 47, an AC voltage measurement at the meter standalone inverter 49, an AC current meter 50. Additionally, there may be provided a generator voltage meter 48.

The following operating conditions are possible:

Operation from the Utility Grid:

The contactors 411, 412, 43 and 45 are closed, the contactors 44 and 46 are open. The loads 6 are supplied with energy from the grid 1 via the import meter 3. The customer generation systems 5 feed energy into the utility grid 1 via the export meter 2. The standalone inverter 7 charges the energy storage device 71. When the energy storage device is charged, trickle charging with low energy expense is generally sufficient. Using the measured values for grid voltage and grid current and a suited anti-islanding method, the standalone inverter 7 constantly monitors the grid parameters of the utility grid and is thus capable of detecting whether there is an island network or not. The standalone inverter 7 is voltage controlled. The internal bridge voltage in the standalone inverter 7 is thereby controlled in such a manner that it is set in amount and phase with respect to the voltage at the logical point in such a manner that the voltage obtained at the logical point is the desired one and that a prescribed battery load current is set.

If the standalone inverter is defective or temporarily fails, it may be disconnected from the logical point 9 via the contactor 45. Once the fault has been corrected, it can synchronize with the voltage at the logical point 9 using the voltage meters 47 and 49 and can resume the load operation of the energy storage device 71.

Transition:

The standalone inverter 7 detects disconnection of the grid 1, a short in close proximity or a failure in the voltage supply in the utility grid. Through its voltage controller, the standalone inverter now tries to keep the voltage stable at the logical point 9. The contactors 411, 412 and 43 are caused to open. If the conditions during transition cause the current from the standalone inverter 7 to exceed a certain maximum, the standalone inverter 7 limits this current to this maximum value in order for the internal components of the standalone inverter not to be overloaded. Then, the voltage at the logical point 9 drops accordingly. As soon as the above mentioned contactors are open, the current only flows into the loads 6. The voltage at the logical point 9 reaches its nominal value again.

Island Operation:

In island operation, the contactor 44 is caused to close so that the customer generation system is capable of synchronizing automatically with the island network at the logical point 9. Now, the thus formed island network can be operated as long as the customer generation system provides enough energy in the average. Fluctuations in production and consumption are evened out by the standalone inverter 7 and its energy storage device 71.

Additionally, an existing generator 8 (e.g., a diesel generator) can be added to the circuit via a contactor 46. For this purpose, the generator is at first started, then the standalone inverter synchronises the voltage in the logical point 9 with the output voltage of the generator 8 using the generator voltage meter 48 and the voltage meter 49. Upon completion of synchronization, the generator contactor 46 is closed.

When the Grid Resumes Operation:

The voltage meter 47 detects when the voltage of the utility grid 1 returns to normal. Upon detection, the contactor 44 is caused to open first. The customer generation system then turns off. Next, the voltage at the logical point 9 is synchronized with the voltage in the grid 1 and the transfer contactor 43 is caused to close. At last, the contactors 411 and 412 are caused to close so as to allow the customer generation system 5 to operate from the grid via the export meter 2. As a result, the loads 6 are supplied from the grid and the customer generation system 5 feeds power into the grid 1.

The transfer contactor 43 may be implemented to be an opener or consist of semiconductor switches. It may be triggered so as to always be closed when grid voltage is applied in the event of a failure of the additional device. As a result, it may be ensured that the loads will not be isolated from the grid upon a failure of the additional device.

All the components of the additional device 4 may be arranged in a suited box, in one or several control panels in the customer generation system 5 or in the standalone inverter 7. The standalone inverter 7 and the energy storage device 71 as well are constituent parts of the additional device 4.

In island operation, the loads 6 can be completely supplied from the customer generation system 5 as long as the energy produced is greater than or equal to consumption. The energy storage device only serves to replace the difference energy between production and consumption. As a result, the efficiency of the entire system increases as an advantage of the AC coupling.

The customer generation system preferably is a PV plant with an associated PV inverter. It also can be a variable speed wind energy plant with a PM generator (permanent synchronous generator).

Figure 2:
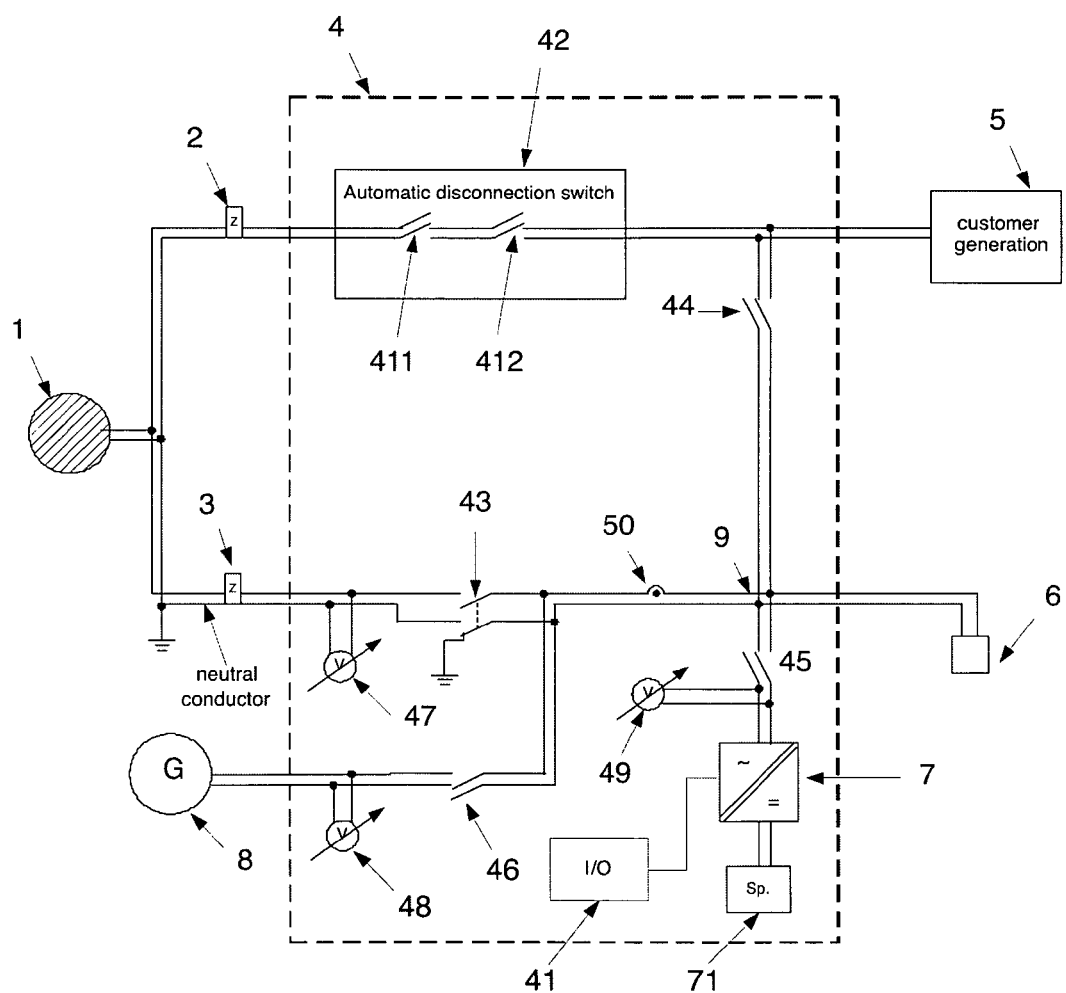

FIG. 2 shows the configuration of the system, the transfer contactor 43 being configured such that, when changing from grid parallel operation to island operation, the pole of the contactor that is connected to the neutral conductor of the logical point 9 can be switched to PE by the neutral conductor of the grid.

Figure 3:
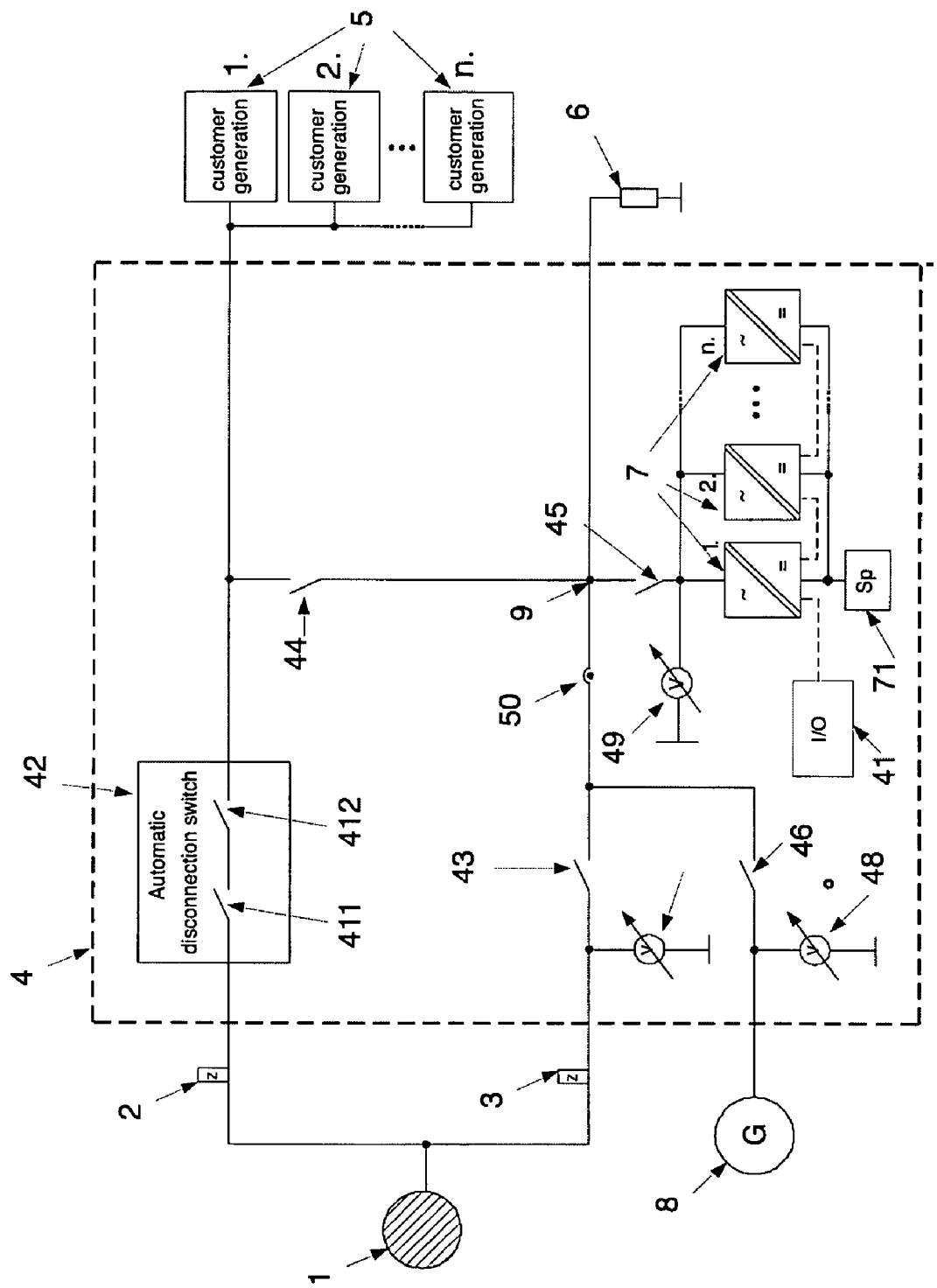

FIG. 3 shows the configuration of the system with several (n) standalone inverters and several (m) customer generation systems on a phase. The standalone inverters may thereby be linked together and to the interface unit 41 through a suited data bus connection.

Figure 4:
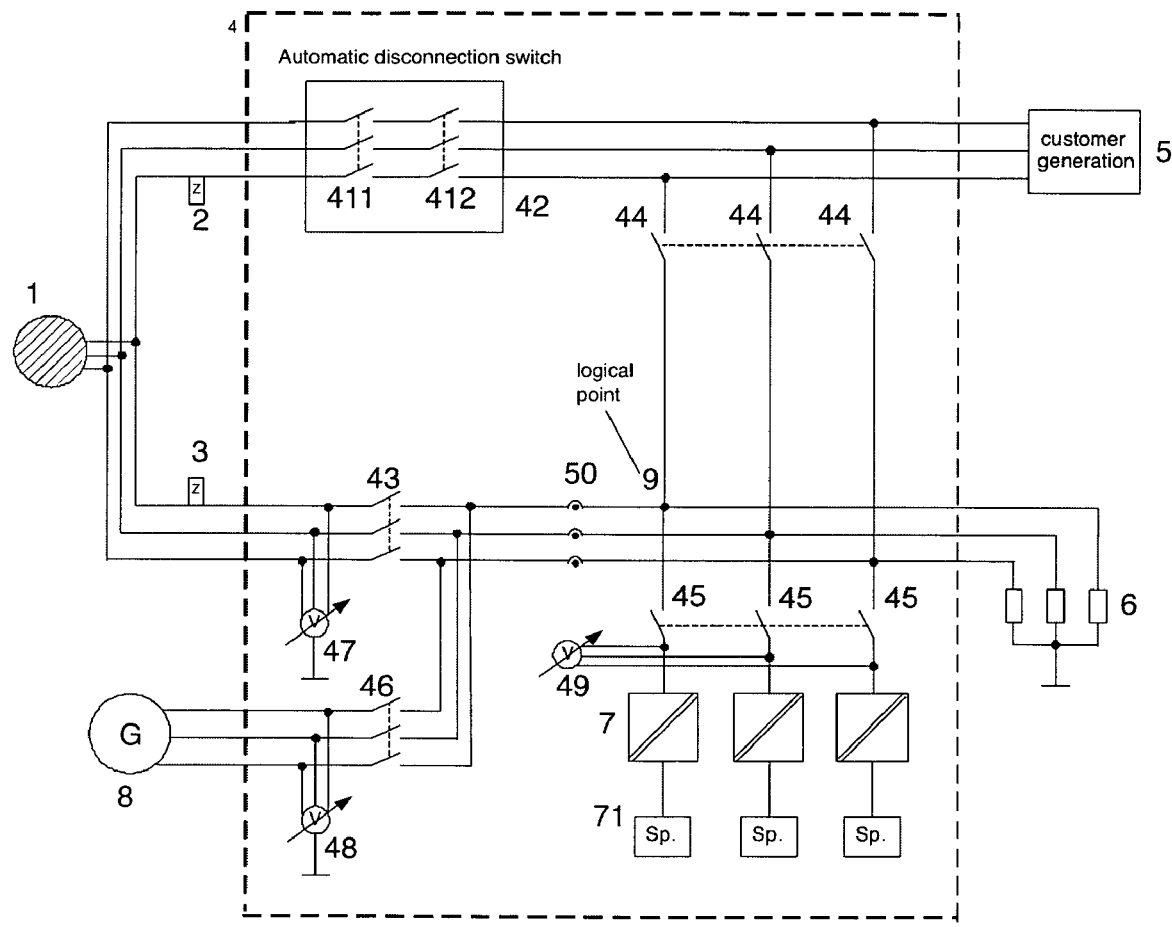

FIG. 4 shows the configuration of the system with a three-phase connection to the utility grid and one standalone inverter for each phase.

Figure 5:
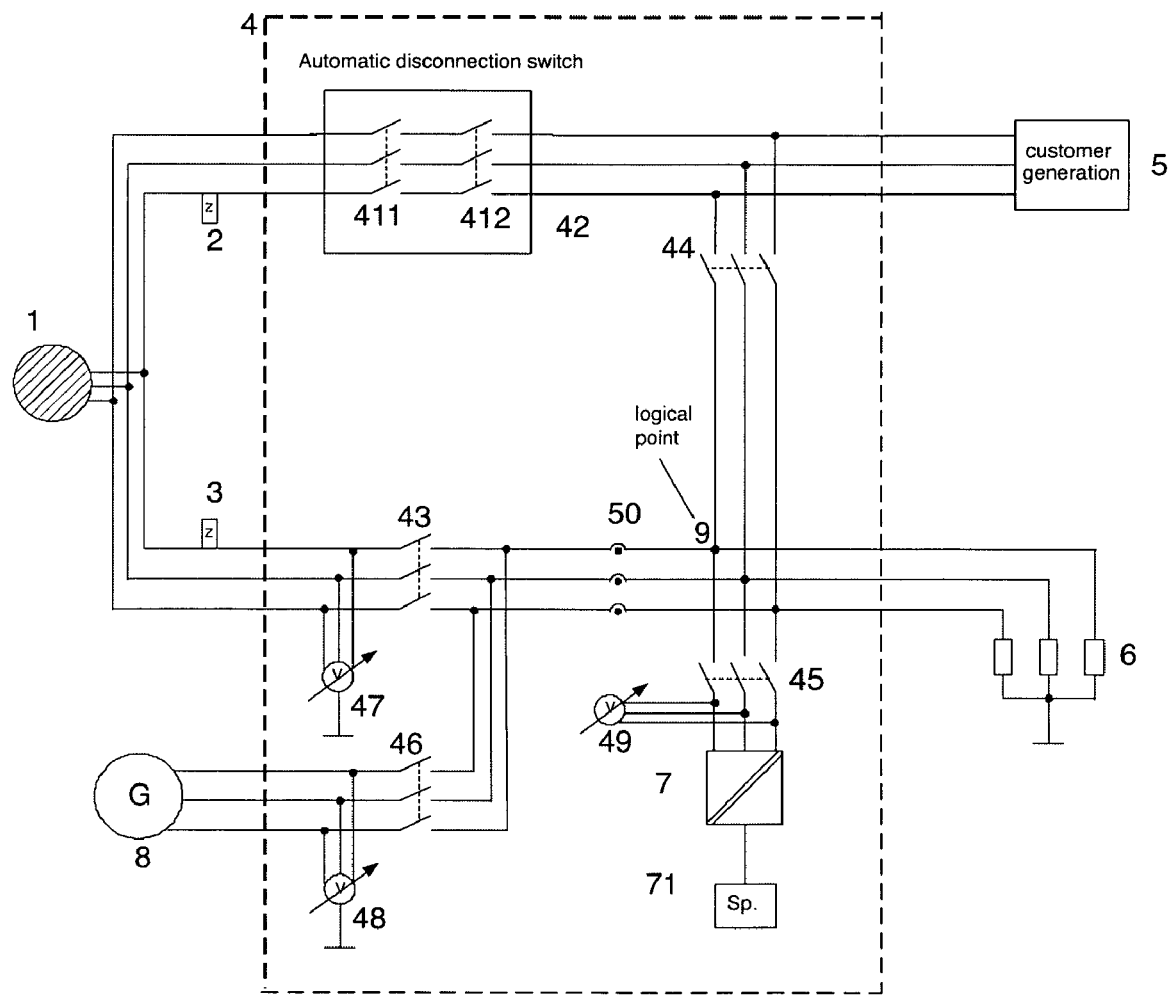

FIG. 5 shows the configuration of the system with a three-phase connection to the utility grid and one three-phase standalone inverter.

Figure 6:
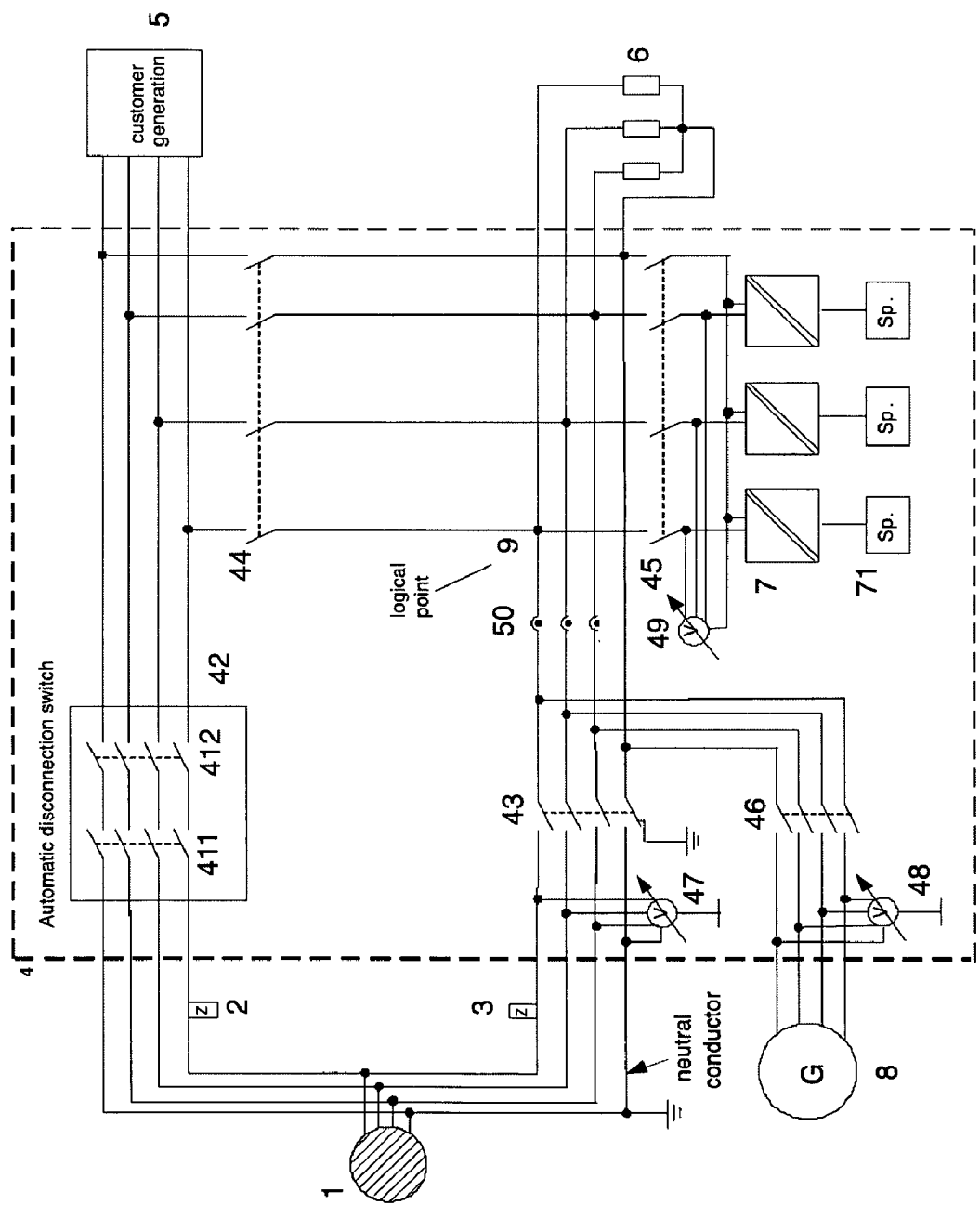

FIG. 6 shows the configuration of the system with the three-phase transfer contactor 43 being configured such that, when changing from grid parallel operation to island operation, the pole of the contactor that is connected to the neutral conductor of the logical point 9 can be switched to PE by the neutral conductor of the grid. The switching operation may also be performed by several contactors.

Figure 7:
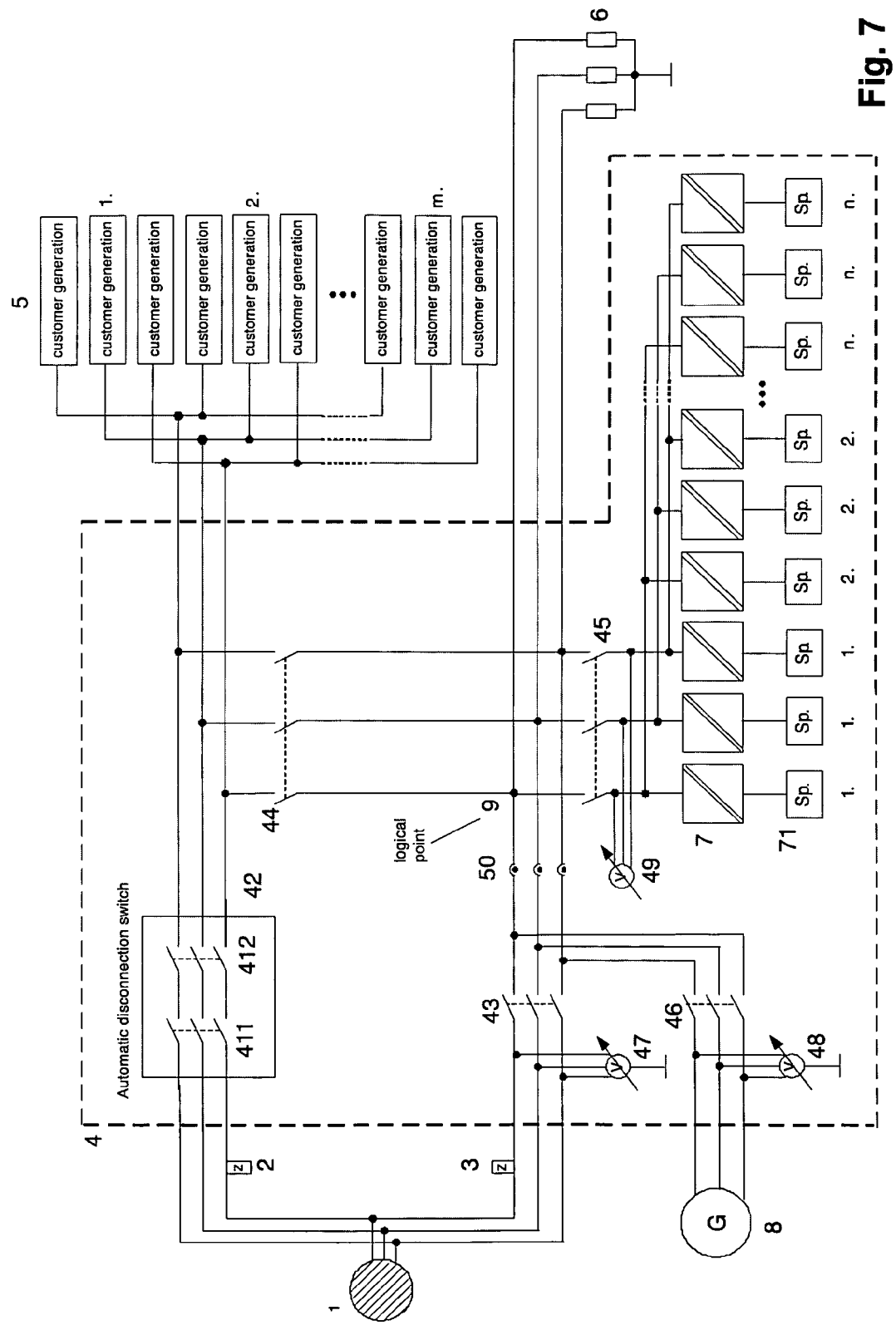

FIG. 7 shows the configuration of the system, with a three-phase connection to the utility grid and more than one (n) standalone inverter for each phase. 0 to m customer generation systems are connected to each phase. 0 to m three-phase customer generation systems may also be connected.

Figure 8:
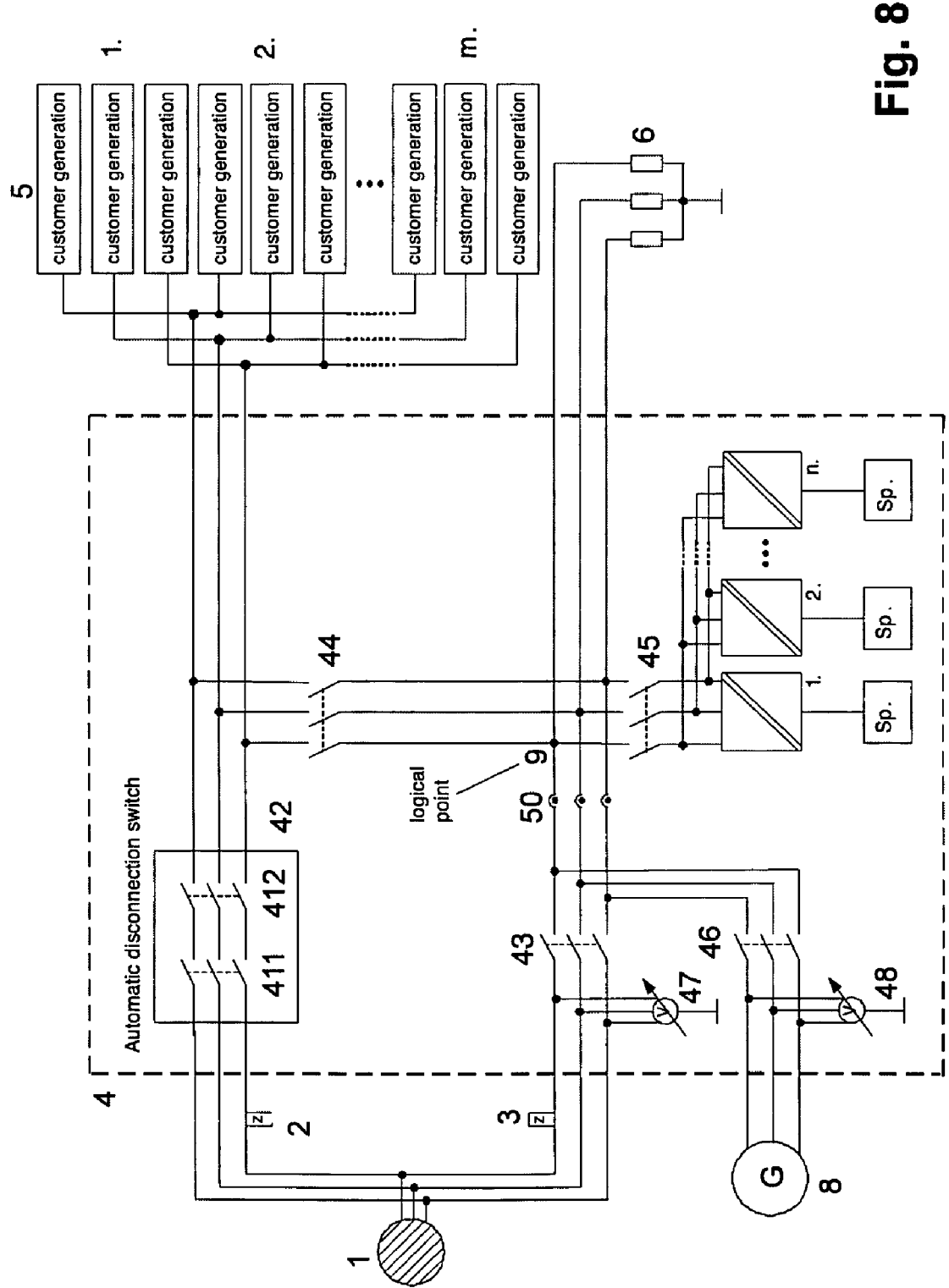

FIG. 8 shows the configuration of the system with a three-phase connection to the utility grid and more than one (n) three-phase standalone inverter. 0 to m customer generation systems are connected to each phase. 0 to m three-phase customer generation systems may also be connected.

The customer generation systems can be implemented with different modes for island operation and for grid parallel operation. Switching between the modes is possible by means of a communication between the additional device 4 and the customer generation system 5. A further improved stability may thus be achieved in the island mode of operation. According to the invention, switching is designed in such a manner that, upon failure or interruption of the data connection between the customer generation system and the additional device, the customer generation system switches to the "grid parallel" mode of operation or remains therein.

Through an appropriate data transfer medium, the additional device can receive data from the grid operator in charge. If corresponding agreements have been made with the grid operator, the additional system may exchange reactive and/or active power with the utility grid on the basis of these data in order to stabilize the voltage at the logical point. As a result, overvoltage occasioned by the infeed of the customer generation system or undervoltage occasioned by large loads for example can be avoided at the logical point.

All the switch elements may be configured to be both contactors and relays or relays with inserted printed circuit boards.

The customer generation system may consist of a wind energy plant with a synchronous generator, a PM generator or an asynchronous generator and with an inverter, a wind energy plant with a grid-coupled synchronous or asynchronous generator, a fuel cell with an associated inverter. The customer generation system may further be a hydroelectric power plant with a grid-coupled synchronous or asynchronous generator or a variable speed hydroelectric installation with a PM generator, a synchronous generator or an asynchronous generator and an associated grid inverter. The customer generation system may also consist of a combustion engine with a grid-coupled synchronous or asynchronous generator, a variable speed combustion engine with a PM generator, a synchronous generator or an asynchronous generator and an associated grid inverter. Further, the customer generation system may consist of a fuel cell with an associated inverter or be a customer generation system of another kind.

In summary, the additional device shown in the FIGS. 1-8 is characterized in that:

The backup power system has its own grid monitoring and island network detection and that it makes the customer generation system 5 fit for use as a backup power supply system.

The backup power system is provided with one or several standalone inverters 7 and one or more energy storage devices 71.

In one embodiment, the standalone inverter 7 is voltage controlled so that, in the event of a grid failure, there is no need for controller switching.

The additional device 4 contains an automatic switch 42 and that, as a result thereof, the grid monitoring of the customer generation system can be set so as to be operated both in the grid parallel operation mode and in the island operation mode (meaning, the grid monitoring is performed by the additional device 4 with the standalone inverter 7).

The backup power supply, consisting of the customer generation system 5 and the additional device 4 is sort of an online UPS system that continues to supply the loads without interruption in the event of most of the occurring grid failures.

The customer generation system 5, the loads 6, the standalone inverter(s) 7, and the utility grid 1 are connected through the logical point 9 on the AC side.

The additional device 4 comprises an automatic switch 42, a transfer contactor 43 and a contactor 44.

The additional device 4 also contains a grid voltage meter 47 and a grid current meter 50.

The additional device 4 is connected to grid-parallel customer generation systems 5.

The automatic switch 42 contains, in one embodiment, two series-connected contactors 411 and 412.

The additional device 4 additionally contains an interface unit 41.

The interface unit 41 serves for linking the standalone inverter(s) 7 to the sensors and actuators in the additional device 4; the connection may thereby be performed by a suited data bus (e.g., a CAN bus).

The additional device 4 may additionally contain a generator contactor 46 and a generator voltage meter 48.

The additional device 4 additionally contains a contactor 45 for disconnecting the standalone inverter and a voltage meter 49 on the standalone inverter.

The components of the additional device 4 are disposed in an appropriate box, in one or several control panels in the customer generation system 5 or in the standalone inverter 7.

The backup power system may be extended by simply connecting in parallel one or several standalone inverters.

The several standalone inverters are data connected to a suited data bus.

The standalone inverters 7 and the customer generation system 5 are constructed with semiconductor switches such as MOS transistors, IGBTs, GTOs.

The standalone inverters 7 are galvanically connected to the logical point.

The standalone inverter(s) are not galvanically connected to the logical point 9 and contain(s) a transformer operated at the same frequency as the grid.

The standalone inverter(s) 7 are not connected to the logical point 9 and contain(s) one or more transformers that are, in one embodiment, operated at a frequency that is higher than the frequency of the grid.

The standalone inverter(s) 7 are (a) one-phase or three-phase inverter(s).

The one or several customer generation systems 5 are connected through a one-phase or a three-phase connection.

The standalone inverter(s) 7 are configured to be a full bridge.

The transfer contactor 43 is a one-pole contactor and that the neutral conductor is not switched when switching from grid parallel operation to island operation.

The transfer contactor 43, in one embodiment, is a two-pole contactor, the one pole being configured such that, when changing from grid parallel operation to island operation, the pole of the contactor that is connected to the neutral conductor of the logical point 9 can be switched to PE by the neutral conductor of the grid 1.

The transfer contactor 43, in another embodiment, is a three-pole contactor, wherein the neutral conductor is not switched when switching from grid parallel operation to island operation.

The transfer contactor 43, in another embodiment, is a four-pole contactor, the one pole being configured such that, when changing from grid parallel operation to island operation, the pole of the contactor that is connected to the neutral conductor of the logical point 9 can be switched to PE by the neutral conductor of the grid 1.

The switch elements 411, 412; 42, 43, 44, 45, 46 can be configured to be contactors, relays or relays with inserted printed circuit boards.

The loads 6 can be supplied entirely by the customer generation system 5 in the island mode of operation as long as the energy produced is greater than or equal to consumption.

The customer generation system is a PV plant with a corresponding inverter, a variable speed wind energy plant with a PM generator, a synchronous generator or an asynchronous generator and an inverter. Alternatively, the customer generation system may comprise a wind energy plant with a grid-coupled synchronous or asynchronous generator, a fuel cell with an associated inverter, a hydroelectric power plant with a grid-coupled synchronous or asynchronous generator or a variable speed hydroelectric installation with a PM generator, a synchronous generator or an asynchronous generator and an associated grid inverter. Still further, the customer generation system may comprise a combustion engine with a grid-coupled synchronous or asynchronous generator, a variable speed combustion engine with a PM generator, a synchronous generator or an asynchronous generator and an associated grid inverter or a customer generation system of another kind.

The energy storage device 71 may comprise a battery, a double layer capacitor, an EEstore, a fuel cell, a flywheel, a pump storage plant or any other energy storage device.

The additional device is implemented such that the energy consumed by the loads and the energy fed by the customer generation system is metered by separate meters.

The grid monitoring and the island network detection provided in the additional device rely on a passive method, according to one embodiment.

The grid monitoring and the island network detection provided in the additional device rely on a active method, according to another embodiment.

The additional device is capable of exchanging reactive and active power with the utility grid upon demand by the grid operator in charge.

The additional device exchanges reactive and active power with the utility grid in order to improve the voltage quality of the utility grid at the logical point.

The transfer contactor 43 is configured to be an opener, in one embodiment.

The transfer contactor 43 is configured to be a semiconductor switch, in one embodiment.

In the event of a short in a load electric circuit during island operation, overload protection members of the load circuits are enabled by the standalone inverter(s) 7.

In the event of a short in an electric circuit of a load during island operation and of the voltage drop at the logical point 9 related thereto, the contactor 45 remains closed until the standalone inverter 7 is capable of enabling the overload protection member of the load electric circuit so that the voltage in the logical point 9 can be restored.

Once the batteries have been completely charged, the standalone inverter enters an energy saving mode, turning off everything except the grid monitoring system in order to save energy.

The transfer contactor 43 is turned on as soon as there is voltage in the utility grid and the standalone inverter(s) operate in the charging mode of operation or are not operative.

The contactors 411, 412; 44 are turned off upon failure of the grid monitoring system in the additional device 4.

The customer generation system 5 is data connected to the additional device 4 and is influenced in such a manner through data communication that switching the mode of operation from island operation to grid operation is possible.

The switching of the operation module—island operation/grid parallel operation—of the customer generation system 5 is configured such that, when the data connection is defective, the customer generation system passes to the grid parallel mode of operation or remains in this mode.

The data connection is performed by means of wire-bound communication and/or by radio communication and/or by powerline communication.

The command for switching between island operation and grid parallel operation of the customer generation system 5 is transmitted by means of a simple analogous or digital signal.

The command for switching between island operation and grid parallel operation of the customer generation system 5 is transmitted through the power lines by means of a centralized ripple control signal.

In accordance with the invention, the backup power system is operated in parallel with the customer generation system, the loads and the utility grid so that it is possible to extend it using modules and that existing systems can be readily retrofitted therewith.

Existing customer generation system may be extended using modules so as to serve as a backup power supply system. The performance of the backup power supply system can be readily increased at a later stage.

Customer generation system, utility grid, loads and backup power supply system may be connected in parallel on the AC side.

In the event, the utility grid no longer supplies power, the loads can be supplied without any interruption. In the event that a short occurs in close proximity within the utility grid, the supply of the loads may be interrupted for less than 30 ms.

The additional power consumption for providing uninterruptible power supply may be minimal.

The energy fed into the utility grid by the customer generation system cannot be minimized by the additional device.

We claim:

1. A backup power system configured to be a UPS system, with a customer generation system and with a network monitoring device, comprising:
   a first connection node connected to the customer generation system and connected to at least one automatic disconnection switch including a first switch, said first switch being disposed between the customer generation system and a utility grid, and the first connection node further connected to a second switch connected to one or several loads;
   a second connection node connected to the second switch and connected to the load, the second connection node further connected to a third switch disposed between the utility grid and the load and the second connection node further connected to a fourth switch to which there is connected a standalone inverter with a storage device,
   a third connection node, connecting said first switch and said third switch to said utility grid,
   wherein the customer generation system is configured to supply an AC voltage to the system, in parallel to the utility grid, and wherein the grid monitoring device is configured to open the first switch upon a failure of the utility grid.

2. The backup power system as set forth in claim 1, wherein each of the first, second, third and fourth switches l are integrated in an additional device separate from the customer generation system and the utility grid, wherein each of the switches are disposed in an appropriate box or in one or several control panels and that the additional device is connected between the utility grid and the customer generation system.

3. The backup power system as set forth in claim 2, wherein the grid monitoring device is configured to control the coupling of the customer generation system to the utility grid so that, when the utility grid fails, the additional device is completely isolated from the utility grid.

4. The backup power system as set forth in claim 1, wherein the customer generation system comprises a plurality of customer generation systems connected together in parallel.

5. The backup power system as set forth in claim 1, wherein the standalone inverter comprises a plurality of standalone inverters connected together in parallel to the fourth switch.

6. The backup power system as set forth in claim 1, further comprising an export power meter connected to the first switch and an import meter connected to a fourth switch interposed between the utility grid and the load.

7. The backup power system as set forth in claim 1, further comprising a fifth switch configured to connect an additional generator to the the second connection node, wherein the additional generator comprises a combustion engine generator.

8. The backup power system as set forth in claim 1, wherein the customer generation system comprises at least one photovoltaic generator.

9. The backup power system as set forth in claim 1, wherein the standalone inverter comprises a voltage controlled standalone inverter.

10. The backup power system as set forth in claim 2, wherein the additional device comprises an automatic disconnection switch so that the network monitoring of the customer generation system is set so as to be operable both in the grid parallel mode and in the island mode of operation.

11. The backup power system as set forth in claim 10, wherein the additional device comprises an automatic disconnection switch that comprises a transfer contactor, a contactor, a grid voltage meter and a grid current meter.

12. The backup power system as set forth in claim 11, wherein the transfer contactor comprises a two-pole contactor, the one pole being configured such that, upon switching from grid parallel operation to island operation, the pole of the contactor that is connected to a neutral conductor of the logical point is switched to PE by a neutral conductor of the grid.

13. The backup power system as set forth in claim 1, wherein in an island operation, a power of the customer generation system is supplied to the load.

14. The backup power system as set forth in claim 2, wherein the network monitoring and island network detection provided in the additional device rely on a passive or an active method.

15. The backup power system as set forth in claim 1, wherein in the event of a short circuit condition in a load electric circuit during island operation resulting in a voltage drop at the second connection node related thereto, the the fourth switch is configured to remain closed until the standalone inverter enables an overload protection member of the load electric circuit so that the voltage in the the second connection node is restored.

16. The backup power system as set forth in claim 1, wherein once the storage device associated with the standalone inverter has been completely recharged, the standalone inverter enters an energy mode in which it turns off everything except the network monitoring device in order to save energy.

17. The backup power system as set forth in claim 11, wherein the third switch is configured to switch on as soon as there is voltage in the utility grid and the standalone inverter operates in a charging mode of operation or is not operative.

18. A method of operating a system as set forth in claim 1, wherein the customer generation system is data connected to the additional device and is influenced in such a manner through data communication that switching the mode of operation from island operation to grid parallel operation is possible, the switching of the mode of operation—island operation/grid parallel operation—of the generation system being designed such that, upon failure of the data connection, the customer generation system switches over to grid parallel operation or remains in this mode of operation.

* * * * *